(12) United States Patent
Grimmond

(10) Patent No.: US 10,035,678 B2
(45) Date of Patent: Jul. 31, 2018

(54) CONDUIT STORAGE OR DEPLOYMENT SYSTEM AND ASSOCIATED METHODS

(71) Applicant: Floating Cable Tanks Limited, Avon (GB)

(72) Inventor: Robert Grimmond, Avon (GB)

(73) Assignee: Floating Cable Tanks Limited (GB)

( * ) Notice: Subject to any disclaimer, the term of this patent is extended or adjusted under 35 U.S.C. 154(b) by 383 days.

(21) Appl. No.: 14/648,341

(22) PCT Filed: Nov. 28, 2013

(86) PCT No.: PCT/GB2013/053145
§ 371 (c)(1),
(2) Date: May 29, 2015

(87) PCT Pub. No.: WO2014/083341
PCT Pub. Date: Jun. 5, 2014

(65) Prior Publication Data
US 2015/0307317 A1     Oct. 29, 2015

(30) Foreign Application Priority Data

Nov. 30, 2012   (GB) ................................ 122589.3

(51) Int. Cl.
*B65H 75/44* (2006.01)
*F16L 1/24* (2006.01)
(Continued)

(52) U.S. Cl.
CPC ......... *B65H 75/4481* (2013.01); *B65H 75/38* (2013.01); *B65H 75/4402* (2013.01);
(Continued)

(58) Field of Classification Search
CPC ............... B65H 75/38; B65H 75/4481; B65H 75/4486; B65H 75/4489; B65H 2701/33; F16L 1/20; F16L 1/203; F16L 1/24
See application file for complete search history.

(56) References Cited

U.S. PATENT DOCUMENTS 3,247,674 A    4/1966   Macardier
3,742,536 A    7/1973   Sada et al.
(Continued)

FOREIGN PATENT DOCUMENTS

EP    2085308 A2    8/2009
GB     384186 A    12/1932
(Continued)

OTHER PUBLICATIONS

International Search Report for PCT/GB2013/053145 dated Feb. 2, 2015.
(Continued)

*Primary Examiner* — William E Dondero
(74) *Attorney, Agent, or Firm* — Andrus Intellectual Property Law, LLP

(57) ABSTRACT

A buoyant conduit storage system comprising a reel for storing conduit and a drive arrangement for rotating the reel. The reel is rotatable about a substantially vertical axis of rotation to reel and/or unreel the conduit. The drive arrangement drives the reel at the axis of rotation. The buoyant storage system may provide for the storage and/or transportation and/or deployment of reelable conduit.

16 Claims, 11 Drawing Sheets

(51) Int. Cl.
*F16L 1/20* (2006.01)
*B65H 75/38* (2006.01)

(52) U.S. Cl.
CPC ..... *B65H 75/4486* (2013.01); *B65H 75/4489* (2013.01); *F16L 1/20* (2013.01); *F16L 1/203* (2013.01); *F16L 1/24* (2013.01); *B65H 2701/33* (2013.01)

(56) References Cited

U.S. PATENT DOCUMENTS

| | | | |
|---|---|---|---|
| 4,117,692 A | 10/1978 | Oberg | |
| 7,438,617 B2 * | 10/2008 | Poldervaart | B63B 22/021 114/230.1 |
| 9,359,187 B2 * | 6/2016 | Bodanewse | B65H 75/38 |
| 2007/0155260 A1 * | 7/2007 | Poldervaart | B63B 22/021 441/5 |
| 2012/0037265 A1 * | 2/2012 | Bodanese | B65H 75/38 141/1 |

FOREIGN PATENT DOCUMENTS

| | | | |
|---|---|---|---|
| GB | 925432 A | 5/1963 | |
| SU | 1634203 A1 | 3/1991 | |
| WO | 2005059432 A1 | 6/2005 | |

OTHER PUBLICATIONS

British Search Report for Patent Application No. GB1321014.1 dated May 19, 2014.

* cited by examiner

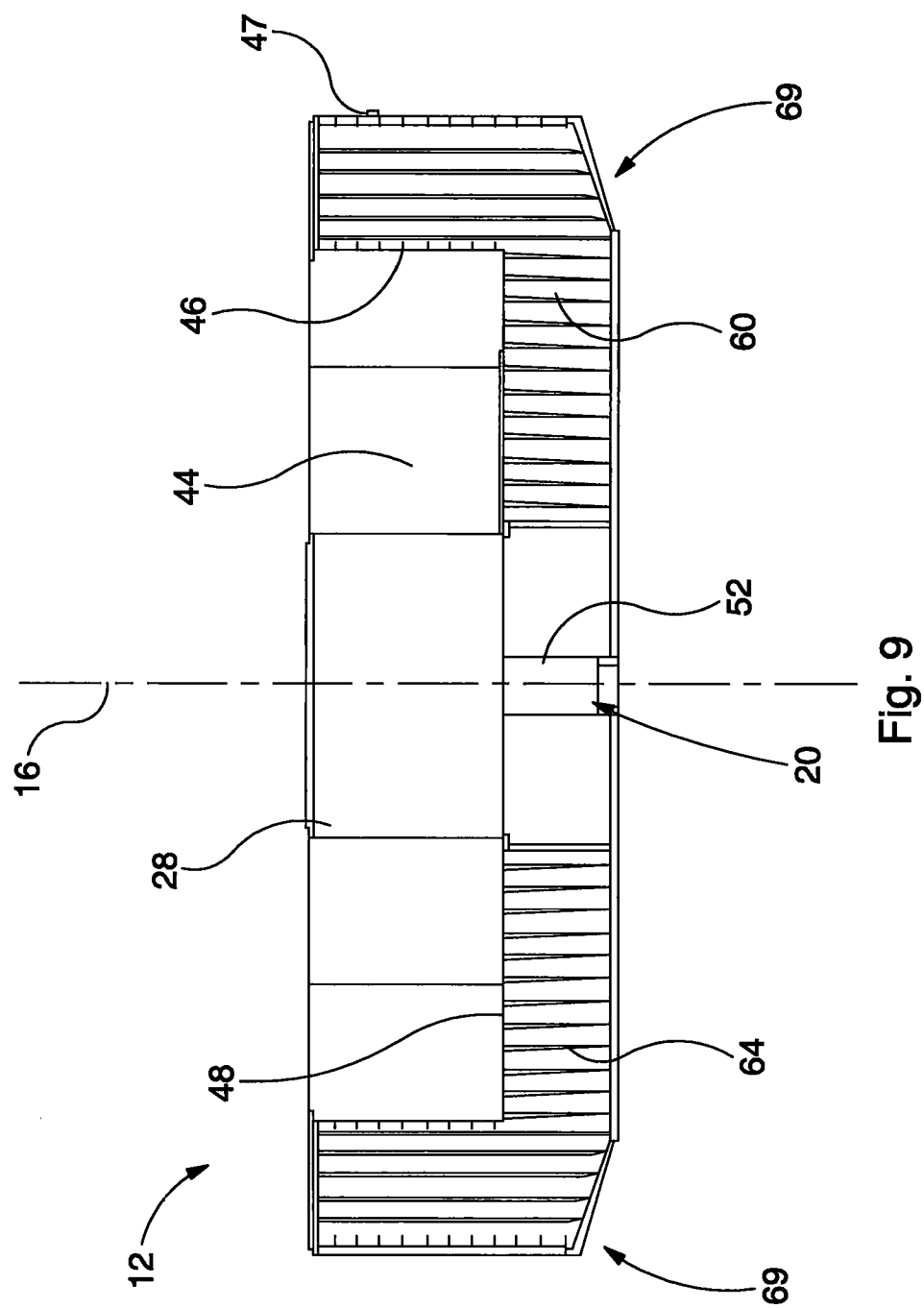

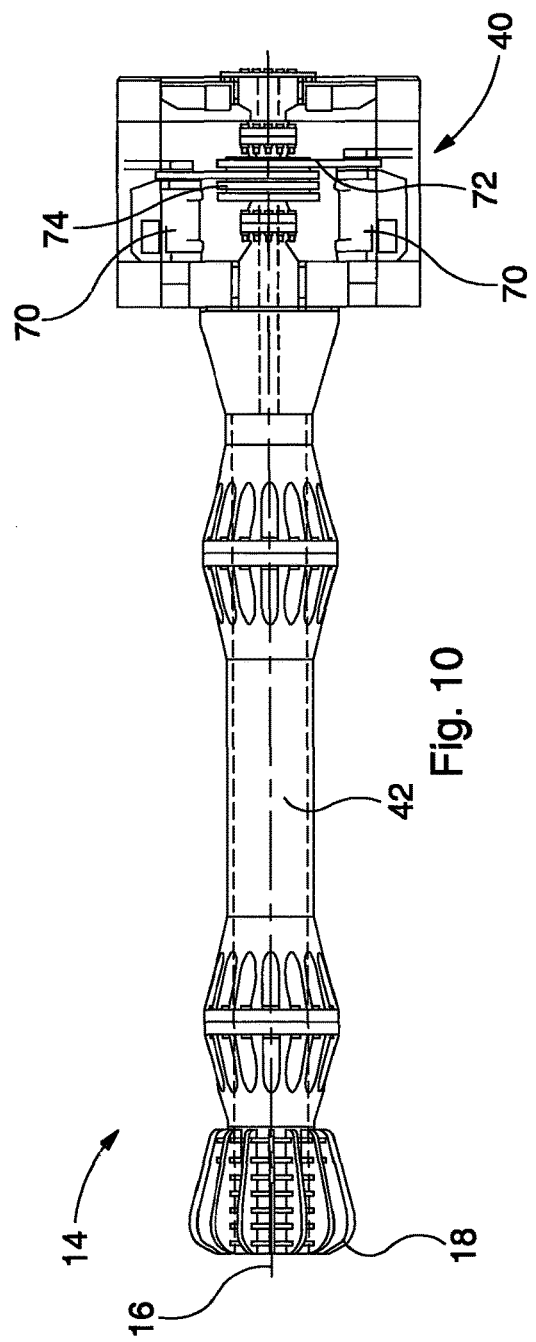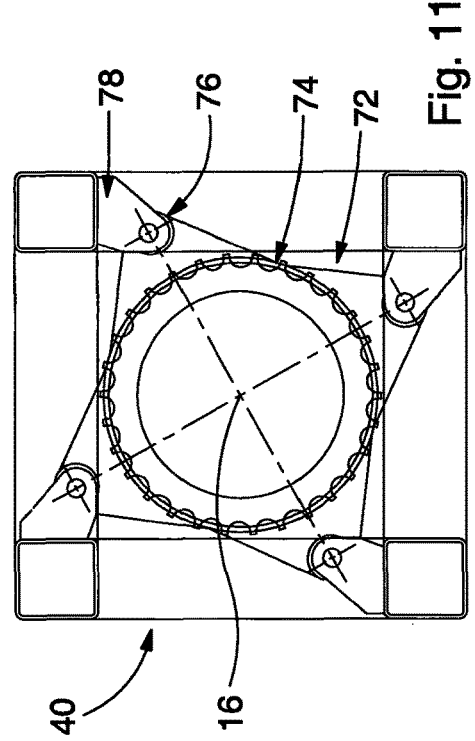

CONDUIT STORAGE OR DEPLOYMENT SYSTEM AND ASSOCIATED METHODS

CROSS REFERENCE TO RELATED APPLICATIONS

The present application is the U.S. national stage application of International Application PCT/GB2013/053145, filed Nov. 28, 2013, which international application was published on Jun. 5, 2014 as International Publication WO 2014/083341. The International Application claims priority of British Patent Application 1221589.3, filed Nov. 30, 2012, the contents of which are incorporated herein by reference in their entireties.

FIELD OF THE INVENTION

This invention relates to the storage and/or transportation and/or deployment and/or retrieval of conduit. In particular, but not exclusively, embodiments of the invention relate to cable storage and deployment systems and methods.

BACKGROUND TO THE INVENTION

Conduit, such as cable or pipeline, is increasingly used in environments accessible via seas or waterways. Conventionally marine transport of conduit has involved large reels, cages or tanks on vessels, such as pipelaying vessels, or supply vessels, for transportation of the conduit to an installation or unloading site. Typically, continuous conduit is rolled onto the reel, cage or tank when the vessel is docked at an onshore supply base. However, permanently locating the drum or reel, cage or tank on the vessel means that after all the conduit on the reel, cage or tank has been deployed, the vessel must return to the onshore supply base to replenish conduit. This involves breaks in work, costing both time and money, or it requires multiple vessels to provide a continuous supply of conduit. In addition, manufacture or loading of the conduit onto the reels, cages or tanks may be dependent on the presence of a vessel, as space at the supply base may be at a premium.

As an alternative, floating reels have been used to accommodate conduit for storage or transportation. In some applications, a reel or multiple reels have been towed along behind a vessel to free up deck space. The floating reels require heavy duty reels and associated equipment to manage reeling or unreeling in marine environments.

U.S. Pat. No. 4,117,692 describes a cable laying arrangement in which cables are retracted from a floating cable storage reel. GB384186 and SU1634203 describe arrangements including a floating cable storage drum. WO2005/059432 describes an arrangement in which a hose is stored upon a floating reel.

SUMMARY OF THE INVENTION

According to a first aspect of the invention, there is provided a buoyant conduit storage system comprising:
a reel for storing conduit, the reel being rotatable about a substantially vertical axis of rotation to reel and/or unreel the conduit;
a drive arrangement for rotating the reel at the axis of rotation; and
an interengaging coupling arrangement for releasably connecting the drive arrangement to the reel.

The buoyant storage system may provide for the storage and/or transportation and/or deployment of the reelable conduit.

The reel may be centrally driven by the drive arrangement.

The reel may be driven at a horizontal position of a centre of gravity of the reel. For example, the reel may be driven above the centre of gravity of the reel (e.g. directly above and/or below).

The reel may be driven by the drive system at a height of a centre of gravity of the reel (e.g. a vertical position of the centre of gravity of the reel). For example, the reel may be driven laterally adjacent the centre of gravity of the reel (e.g. substantially directly laterally adjacent).

The reel may be driven substantially at the centre of gravity of the reel.

The centre of gravity of the reel may be defined prior to and/or during and/or subsequent to reeling the conduit. For example, the reel may be driven at a horizontal position of the centre of gravity of the reel prior to, during and subsequent to reeling the conduit (e.g. with a drive arrangement encompassing multiple positions of the centre of gravity and/or a dynamic drive arrangement adaptable to a change in a position of the centre of gravity).

The reel may be driven by the drive system at a height (or vertical position) of a centre of buoyancy of the reel, such as a centre of buoyancy of the reel in a neutral position.

The neutral position may be defined when the reel is in a substantially horizontal configuration, such as in calm water with no heave, wave, swell or the like. The verticality of the axis of rotation of the reel may be defined at the neutral position.

The reel may be driven at a horizontal position of a centre of buoyancy of the reel.

The reel may be driven substantially at the centre of buoyancy of the reel.

Driving the reel at a position corresponding to the horizontal and/or vertical centre of gravity and/or buoyancy of the reel may at least reduce an effect due to a floating motion of the reel and/or of the reeling and/or unreeling of the conduit. Accordingly, the system may be configured to reduce the imparted structural loads on the reel (e.g. due such effect/s). Such a system may result in lower stresses and/or strains (in the reel and/or drive arrangement).

The drive arrangement may apply balanced tangential drive forces to the reel.

The conduit may comprise a cable and/or a wire.
The conduit may comprise a tubing.
The conduit may comprise a pipe.
The conduit may be denser than water. For example, the conduit may comprise a cable or a pipeline to be laid in/on a seabed.

The conduit may comprise a floating conduit. For example, the conduit may comprise a floating pipeline or cable.

The drive arrangement may be configured to rotationally drive the reel substantially without imparting a propulsive force, such as a lateral propulsive force.

The drive arrangement may be configured to transmit rotational drive force/s to the reel balanced around/about the axis of rotation. The drive arrangement may be configured to transmit balanced tangential forces to the reel (e.g. such that no applied tangential drive force requires a non-drive reaction component to resist a non-rotational or linear displacement of the reel in a direction of an applied tangential drive force). The drive arrangement may be configured to rotate the reel about the axis of rotation without imparting any substantial net vector force non-rotational force component to the reel. Accordingly, the system may not require compensation for any non-rotational force component from the drive system, such as a lateral force. The drive arrangement may be configured to rotate the reel about the axis of rotation without imparting any substantial net vector force non-rotational force component to the reel.

The drive arrangement may provide for substantially axial drive transmission to the reel. The drive arrangement may provide for axial drive transmission to the reel substantially at the axis of rotation. The drive arrangement may comprise a prime mover. The drive arrangement may comprise a motor. The motor may comprise an electric motor. The motor may comprise a hydraulic motor. The motor may comprise a pneumatic motor. The motor may comprise a combustion engine. The motor may be positioned substantially at the axis of rotation of the reel. The drive arrangement may comprise a plurality of motors. The drive arrangement may comprise a reserve or auxiliary power source. The drive arrangement may comprise a redundant motor. The drive arrangement may comprise a tensile element. For example, the drive arrangement may comprise a chain, belt or band, or may include a shaft drive arrangement. The drive may comprise a radial and/or axial drive transmission element, such as a coupling. The drive arrangement may comprise a sprocket and/or a pulley and/or a sheave and/or a gear The drive arrangement may be configured to control a rotation of the reel. The drive arrangement may be configured to apply a retarding or braking force to the reel.

The motor arrangement may be located distal to the axis of rotation. For example, the motor arrangement may be located on a support, such as a ship for mounting the boom. Drive may be transmitted from the motor arrangement to the axis of rotation, such as via shafts and/or pulleys and/or gears and/or chains.

The interengaging coupling may comprise a plate mounted upon a drive shaft, mounting means provided on the reel for cooperation with the plate, and clamp means operable to clamp the plate and the mounting means to one another. The mounting means may comprise a flange. The clamp means may comprise at least one movable clamp arm provided upon the plate. The drive shaft conveniently incorporates a universal joint.

The coupling arrangement may comprise a profiled coupling arrangement.

The interengaging coupling arrangement may be selectively decoupled by axially removing at least a portion of the drive arrangement.

The drive arrangement may comprise a first coupling portion and the reel may comprise a second coupling portion, the first and second coupling portions forming the interengaging profiled coupling arrangement. The first coupling portion may comprise a male coupling portion and the second coupling portion may comprise a female coupling portion. Alternatively, the first coupling portion may comprise a female coupling portion and the second coupling portion may comprise a male coupling portion.

The interengaging coupling arrangement may comprise a guide portion to assist in engaging the first and second coupling portions. The guide portion may comprise a larger opening than one of the interengaging coupling portions. The guide portion may comprise a taper. The guide portion may comprise a funnel.

The inter-engaging profiled coupling arrangement may comprise at least one coupling element connected to the drive arrangement and at least one coupling element connected to the reel, wherein the respective coupling elements are complementary and are adapted to be engaged to couple the reel with the drive arrangement.

The coupling elements may be complementary splines, teeth or other like members such as bosses, pins or studs or the like or alternatively one coupling element may be a spline or other like member, and the other coupling element may be a complementary recess, slot or channel or the like adapted to receive the spline or other like member.

A plurality of coupling elements may be provided and connected to the drive arrangement and the reel respectively. The coupling elements of the drive arrangement may be circumferentially arranged and spaced apart, and the coupling elements of the reel may be circumferentially arranged and spaced apart to correspond to the coupling elements of the drive arrangement.

The drive arrangement may comprise a drive shaft connected to the first coupling portion. The drive shaft may comprise at least a substantially rigid portion. Additionally, or alternatively, the drive shaft may comprise at least a substantially flexible portion. The drive arrangement may be configured to substantially align the drive shaft with the reel's axis of rotation; at least in the neutral position. The system may be configured to accommodate a misalignment between the drive shaft and the reel's axis of rotation. For example, the interengaging coupling arrangement may be configured to transmit drive with the drive shaft and the reel's axis angularly and/or axially misaligned. The system may be configured to transmit power to the reel. The system may be configured to transmit power between the drive arrangement and the reel. The system may be configured to transmit power between the drive arrangement and the reel within a range of misalignment between the drive shaft and the reel's axis of rotation. The system may be configured to transmit drive between the drive arrangement and the reel within a range of misalignment angles between the drive shaft and the reel's axis of rotation.

The system may be configured to allow transmission of drive to the reel when and/or whilst the reel is vertically and/or angularly displaced (e.g. relative to the drive arrangement and/or support). For example, such as due to heave, pitch and/or roll (e.g. caused by waves, wash, tides and/or currents); and/or such as due to reeling and/or unreeling the conduit (e.g. caused by a change in a total mass and/or a distribution of mass of the reel comprising the reeled conduit). The system may be configured to transmit drive between the drive arrangement and the reel within a range of draft of the reel and/or the drive arrangement support (e.g. support vessel/boat). The drive arrangement may be configured to accommodate a change in draft of the reel and/or the drive arrangement support (e.g. due to a change in amount/weight of stored conduit). The drive arrangement may be dynamically supported. For example, the drive arrangement may be hingedly and/or pivotally and/or suspensively mounted (e.g. to allow a vertical and/or angular movement of the drive arrangement).

The drive arrangement may be mounted on a support. The support may comprise a floating support, such as a body or vessel adjacent the reel. The support may comprise a substantially fixed support, such as a dock, quay, platform or the like. The support may comprise an arm. The support may comprise a boom. The boom may be of bent or canted form.

The drive arrangement may be configured to position the reel. The drive arrangement may be configured to anchor the reel. The drive arrangement may comprise a reel positioning member. The drive arrangement may be configured to moor the reel. The system may be configured to moor the reel by the interengaging profiled coupling arrangement. The system may comprise a substantially singular mooring for the reel, such as defined by the interengaging profiled coupling arrangement. The drive arrangement may be configured to transmit drive forces balanced about/around the rotational axis.

The system may be configured to maintain the first coupling portion of the drive arrangement in a substantially vertical orientation. The system may comprise a drive suspension.

The system may comprise a conduit guide. The conduit guide may define at least a portion of a path for conduit between a source of conduit to be reeled and the reel; and/or between the reel and a deployment or storage site for unreeled conduit. The conduit guide may comprise a channel. The conduit guide may comprise a chute. The conduit guide may comprise a track. The conduit guide may comprise a sleeve. The conduit guide may be configured to reduce a stress and/or tension and/or stress/tension concentration/s in the conduit. The conduit guide may be configured to control a position of the conduit as it is reeled onto and/or unreeled from the reel. The conduit guide may define a take-off position of conduit from the reel. The conduit guide may be configured to assist in a wrapping and/or a layering of the conduit as it is reeled. The conduit guide may be configured to assist in an unwrapping and/or a delayering of the conduit as it is unreeled. The conduit guide may comprise a gooseneck. The conduit guide may be dynamic. The conduit guide may define a dynamic take-off position. The take-off position may be at least partially determined by a conduit parameter, such as a conduit rigidity and/or flexibility and/or diameter. The take-off position may be at least partially determined by a reel parameter, such as a reel diameter (inner and/or outer). The take-off position may be at least partially determined by a drive arrangement parameter, such as a drive rate or speed. The take-off position may be at least partially determined by a parameter of the reeled conduit, such as a length and/or volume of the reeled conduit. The dynamic take-off position may be operatively connected to the drive arrangement (e.g. mechanically and/or electronically linked). The system may be configured to extend the dynamic take-off position outwardly corresponding to a predetermined distance for each revolution of the reel. For example, the predetermined distance may correspond substantially to a width (e.g. diameter) of the conduit. The system may be configured to sequentially adjust the dynamic take-off position. For example, the system may be configured to adjust the dynamic take-off position at a/each crossover of a wrap and/or a layer of the conduit. The system may be configured to continuously adjust the dynamic take-off position. For example, the system may be configured to continuously adjust a radial position of the dynamic take-off according to a radial (e.g. spiral) and/or axial (e.g. helical) position of a preceding and/or adjacent wrap and/or layer of conduit. The system may be configured to adjust the take-off position according to a movement of the reel, such as a relative movement between the reel and the drive arrangement and/or support (e.g. heave and/or roll and/or pitch).

The system may be configured to adjust the drive arrangement according to a movement of the reel, such as a relative movement between the reel and the drive arrangement and/or support (e.g. heave and/or roll and/or pitch). For example the system may be configured to adjust a position of the interengaging coupling arrangement portion/s according to a movement of the reel.

The conduit guide may be connected to the drive arrangement. The conduit guide may be operatively connected to the drive arrangement. The conduit guide may be mounted to the drive arrangement. The conduit guide may be driven. At least a portion of the conduit guide may be movable with the drive arrangement. Additionally, or alternatively, at least a portion of the conduit guide may be movable with respect to the drive arrangement.

The system may comprise a powered conduit feed. The conduit feed may be configured to supply conduit to be reeled onto the reel. The conduit feed may be connected to the drive arrangement and/or to the conduit guide. A tension and/or a speed (e.g. a rate of supply/receipt of conduit) of the powered conduit feed may be controlled. The tension and/or the speed may correspond to a drive arrangement parameter, such as a drive arrangement tension and/or a drive arrangement speed (e.g. a rate of receipt/supply of conduit). Control of the powered conduit feed may be operatively connected to the control of the drive arrangement and/or to the control of the conduit guide (e.g. dynamic take-off position). A powered conduit feed parameter may be proportional to a drive arrangement parameter and/or a conduit guide parameter.

The system may comprise a conduit tensioner. The system may comprise a conduit tension controller. The system may comprise an automatic tension controller. The system may comprise a conduit tension measuring apparatus.

The reel may comprise a floating reel. The reel may comprise a floating vessel.

The reel may comprise a drum. The drum may comprise a predetermined diameter. The predetermined diameter may be defined at least partially by a property of the conduit to be stored. For example, the predetermined diameter may be defined at least partially by a minimum bending radius of the conduit. The drum may comprise a central hub. The drum may comprise the first coupling portion of the drive arrangement.

The reel may comprise a flange. The flange may comprise a reel bottom support for supporting the conduit to be stored. The flange may extend outwards from the drum, such as radially outwards. The flange may be positioned on the reel axially opposite the interengaging coupling arrangement, such as substantially axially opposite an opening for coupling and/or decoupling the interengaging coupling arrangement. The flange may be configured to support a lowermost wrap of the conduit (e.g. to directly support a first stored wrap of the conduit).

The reel's coupling portion may be removable from the reel. The drum may be removable. For example, the drum may be releasably connected to the flange. The drum may be bolted to the flange. Alternatively, the drum may be permanently fixed to the flange.

The reel may comprise a sidewall. The sidewall may be located at an outer diameter of the flange. The reel may define a storage volume for receiving the conduit to be stored between the drum and the sidewall.

The reel may be configured to provide a substantially watertight storage volume in normal use. The storage volume may be substantially weathertight in normal use. The storage volume may be substantially water and/or weathertight during transportation and/or storage and/or reeling and/or unreeling. The reel may comprise a cover.

Alternatively, the storage volume may be configured to receive water. For example, the storage volume may be defined by an open structure, such as a basket.

The system may comprise an auxiliary buoyancy to supplement the volume of water displaced by the reel. The auxiliary buoyancy may comprise a foam, such as a syntactic foam.

The reel may be configured to remain stable when fully laden with conduit. The reel may be configured to remain stable with sufficient reserve of stability. For example, the reel may be configured to comply with merchant shipping load-line regulations, or the like. The reel may be configured to be buoyant when the storage volume is full with conduit and/or water (e.g. flooded in a fully and/or partially loaded and/or unloaded state). The reel may be configured to remain buoyant when damaged. For example, the reel may be configured to remain buoyant when one or more bulkheads are flooded (e.g. adjacent bulkheads) in a fully and/or partially loaded and/or unloaded and/or flooded state. Remaining stable may prevent or at least mitigate undesirable rolling, such as to empty a payload (of conduit).

The reel may be configured to remain buoyant when fully laden with conduit. The reel may be configured to be buoyant when the storage volume is full with conduit and/or water (e.g. flooded in a fully and/or partially loaded and/or unloaded state). The reel may be configured to remain buoyant when damaged. For example, the reel may be configured to remain buoyant when one or more bulkheads are flooded (e.g. adjacent bulkheads) in a fully and/or partially loaded and/or unloaded and/or flooded state. The reel may be configured to remain buoyant when up to half of the bulkheads are flooded.

The reel may be configured to be towed. The reel may be configured to be towed in a plurality of directions. The reel may comprise a plurality of fixation points, such as pad eyes. The plurality of fixation points may be circumferentially arranged, such as evenly/equally circumferentially arranged. The plurality of fixation points may be arranged to allow towing in fore, aft, starboard and/or port directions.

The reel may define a hydrodynamic outer hull. The reel may comprise a chamfered and/or bevelled and/or curved and/or radiused edge/s and/or surface/s. The reel may comprise a directional form. For example, the reel may comprise an asymmetric form or profile (e.g. to minimise drag in a direction of tow). The reel may comprise a removable and/or adjustable portion, such as a removable and/or adjustable hull portion (e.g. at a stern and/or bow location/s). The removable and/or adjustable portion/s may be configured to improve the hydrodynamism of the reel. The removable portion may comprise a keel.

The system may comprise a controller. The controller may be configured to control the drive arrangement and/or the conduit guide and/or the conduit feed. The controller may be configured to synchronize the drive arrangement and/or the conduit guide and/or the conduit feed.

According to a further aspect of the invention there is provided a method of storing reelable conduit in a buoyant conduit storage system, the method comprising rotationally driving a reel at its axis of rotation to reel and/or unreel conduit.

According to a further aspect of the invention there is provided a reel for storing reelable conduit in a buoyant conduit storage system, the reel being rotatable about a substantially vertical axis of rotation to reel and/or unreel the conduit, wherein the reel is configured to be rotatably driven at the axis of rotation to reel conduit onto the reel and/or to unreel conduit from the reel.

The reel may comprise a coupling portion for coupling the reel to a drive arrangement to reel and/or unreel conduit onto/from the reel. The coupling portion may be located at the axis of rotation.

The coupling portion may comprise a second interengaging profiled coupling arrangement portion configured to engage a first interengaging profiled coupling arrangement portion of a drive arrangement.

According to a further aspect of the invention there is provided a drive arrangement for rotating a drum for storing reelable conduit in a buoyant conduit storage system, the drive arrangement being configured to rotatably drive the drum at a substantially vertical axis of rotation of the drum to reel conduit onto the drum and/or to unreel conduit from the drum.

The buoyant conduit storage system drive arrangement may comprise a first interengaging profiled coupling arrangement portion configured to engage a second interengaging coupling arrangement of a reel to be driven.

According to a further aspect of the invention there is provided a removable element for a reel for storing reelable conduit in a buoyant conduit storage system.

The removable element may comprise a removable drum.
The removable element may comprise a removable insert.
The removable element may be configured to correspond to a property of a conduit to be stored. For example, the removable element may be related to and/or partially defined by a minimum bending radius of the conduit to be stored.

According to a further aspect of the invention there is provided a method of storing reelable conduit in a buoyant conduit storage system, the method comprising providing a removable element to adapt a reel for storing reelable conduit.

The method may comprise storing a diversity of reelable conduits in a single reel. For example, the method may comprise first storing a first conduit in the reel; then storing a second conduit in the reel (such as after unreeling the first conduit). The method may comprise sequentially storing the diversity of reelable conduits.

According to a further aspect of the invention there is provided an array of reels configured to store reelable conduit in a buoyant conduit storage system.

Each reel may be configured to store a conduit of a particular minimum bending radius.

Each reel may comprise a removable element.

According to a further aspect of the invention there is provided a method of manufacturing a reel for a buoyant conduit storage system.

The method may comprise fixing a coupling portion at a substantially vertical axis of rotation of a reel. The axis of rotation may be a substantially central axis. The method may comprise constructing a substantially hollow reel. The method may comprise providing a substantially compartmentalised substantially hollow volume. The method may comprise constructing a hull to form the reel, such as a substantially cylindrical hull. The method may comprise constructing a plurality of bulkheads. The method may comprise constructing a plurality of substantially internal (e.g. enclosed) and/or external (e.g. at least partially exposed) bulkheads. The method may comprise constructing a reel substantially from sheet materials; such as sheet metal (e.g. steel). The method may substantially comprise sheet construction techniques. The method may comprise providing the reel with a corrosion resistance. The method may comprise cathodically protecting the reel. The method may comprise attaching a sacrificial anode to the reel.

It should be understood that the features defined above in accordance with any aspect of the present invention or below in relation to any specific embodiment of the invention may be utilized, either alone or in combination with any other defined feature, in any other aspect or embodiment of the invention.

BRIEF DESCRIPTION OF THE DRAWINGS

These and other aspects of the present invention will now be described, by way of example only, with reference to the accompanying drawings, in which:

FIG. 9 shows a partial cross section of the reel of FIG. 4;

FIG. 10 is a partial side view of a drive arrangement of the system of FIG. 1;

FIG. 11 shows a plan view of a portion of the drive arrangement of the system of FIG. 1;

DETAILED DESCRIPTION OF THE DRAWINGS

Figure 1:
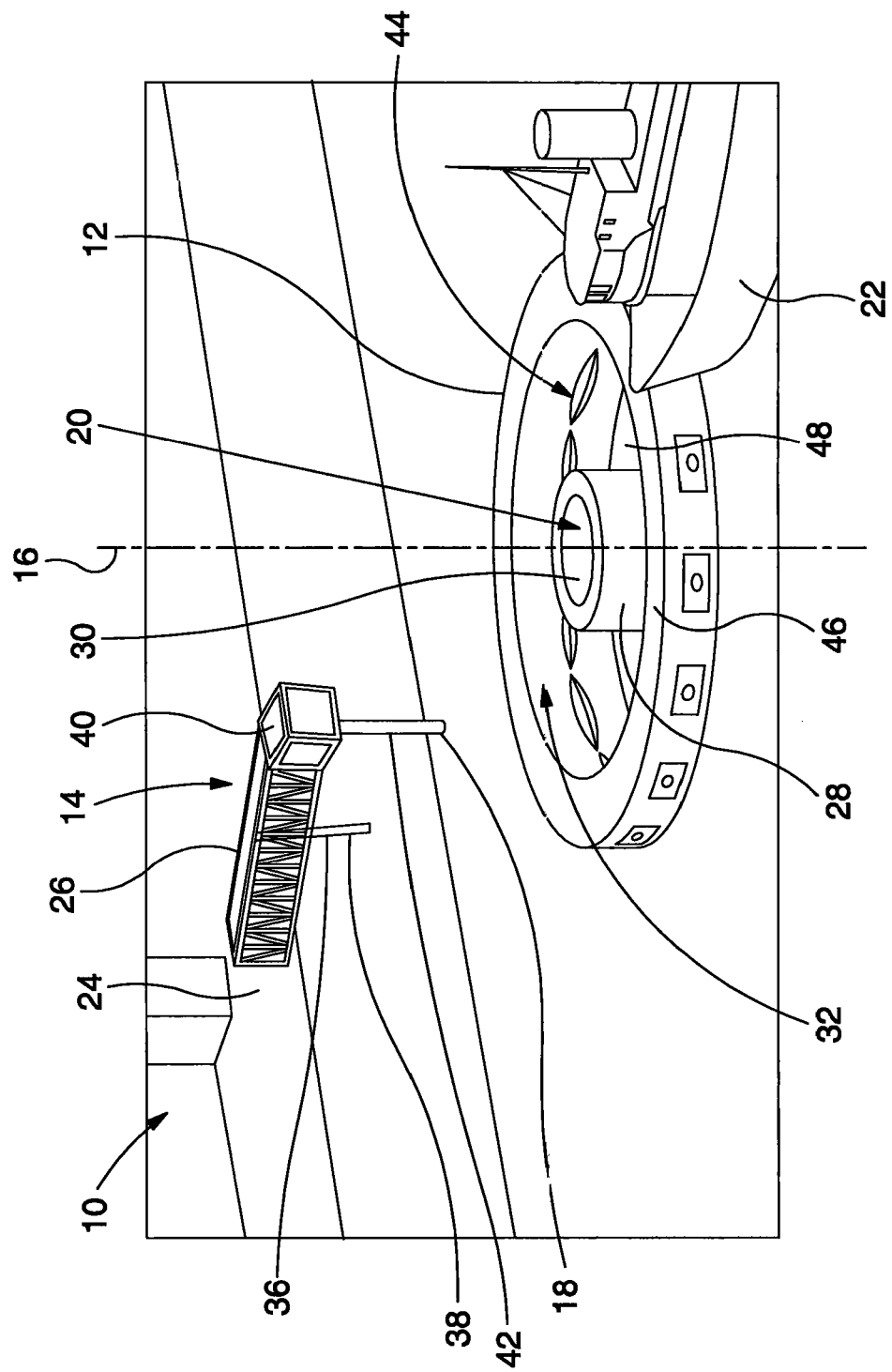
FIG. 1 is a perspective view of a buoyant conduit storage system according to a first embodiment of the invention.

Referring first to FIG. 1, there is shown a buoyant conduit storage system 10 according to a first embodiment of the invention. The system 10 comprises a reel 12 for storing conduit (not shown in FIG. 1) and a drive arrangement 14.

The reel 12 is rotatable about a substantially vertical axis of rotation 16 to reel and/or unreel the conduit. The drive arrangement 14 rotates the reel 12 at the axis of rotation 16. The buoyant storage system 10 provides for the storage of the reelable conduit.

The reel 12 is centrally driven by the drive arrangement 14 substantially at the centre of gravity of the reel 12. FIG. 1 shows the reel 12 in a neutral position, defined when the reel 12 is in a substantially horizontal configuration, such as in calm water with no heave, wave, swell or the like.

Driving the reel 12 at a position corresponding to the horizontal and vertical centre of gravity of the reel 12 may at least reduce an effect due to a floating motion of the reel 12 on the reeling and/or unreeling of the conduit.

Accordingly, the drive arrangement 14 is configured to rotationally drive the reel 12 substantially without imparting a propulsive force, such as a lateral propulsive force, to the reel 12.

In FIG. 1 the drive arrangement 14 is shown decoupled from the reel 12. The drive arrangement 14 shown is mounted to a support in the form of a dockside 24 via a hinged boom 26. In use, the reel 12 is maneuvered into a position to receive a first coupling portion 18 of the drive arrangement 14 in a second coupling portion 20 of the reel 12. In the embodiment shown in FIG. 1, the reel 12 is maneuvered into position by a boat 22. It will be appreciated that the reel 12 may be maneuvered using additional or alternative means, such as additional or alternative mooring lines.

Figure 2:
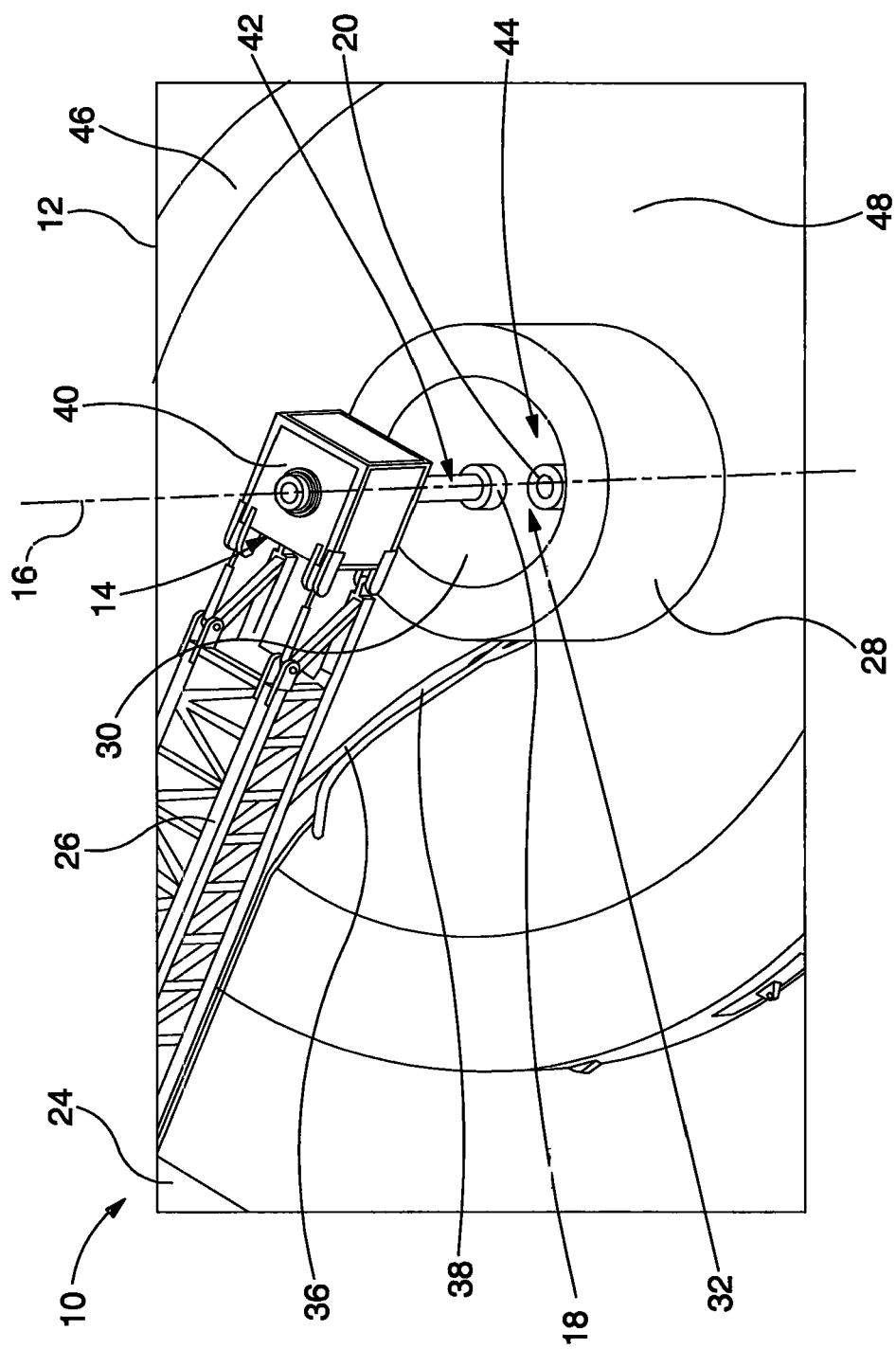
FIG. 2 is a perspective view of the buoyant conduit storage system of FIG. 1, with an interengaging coupling arrangement disengaged.
Figure 3:
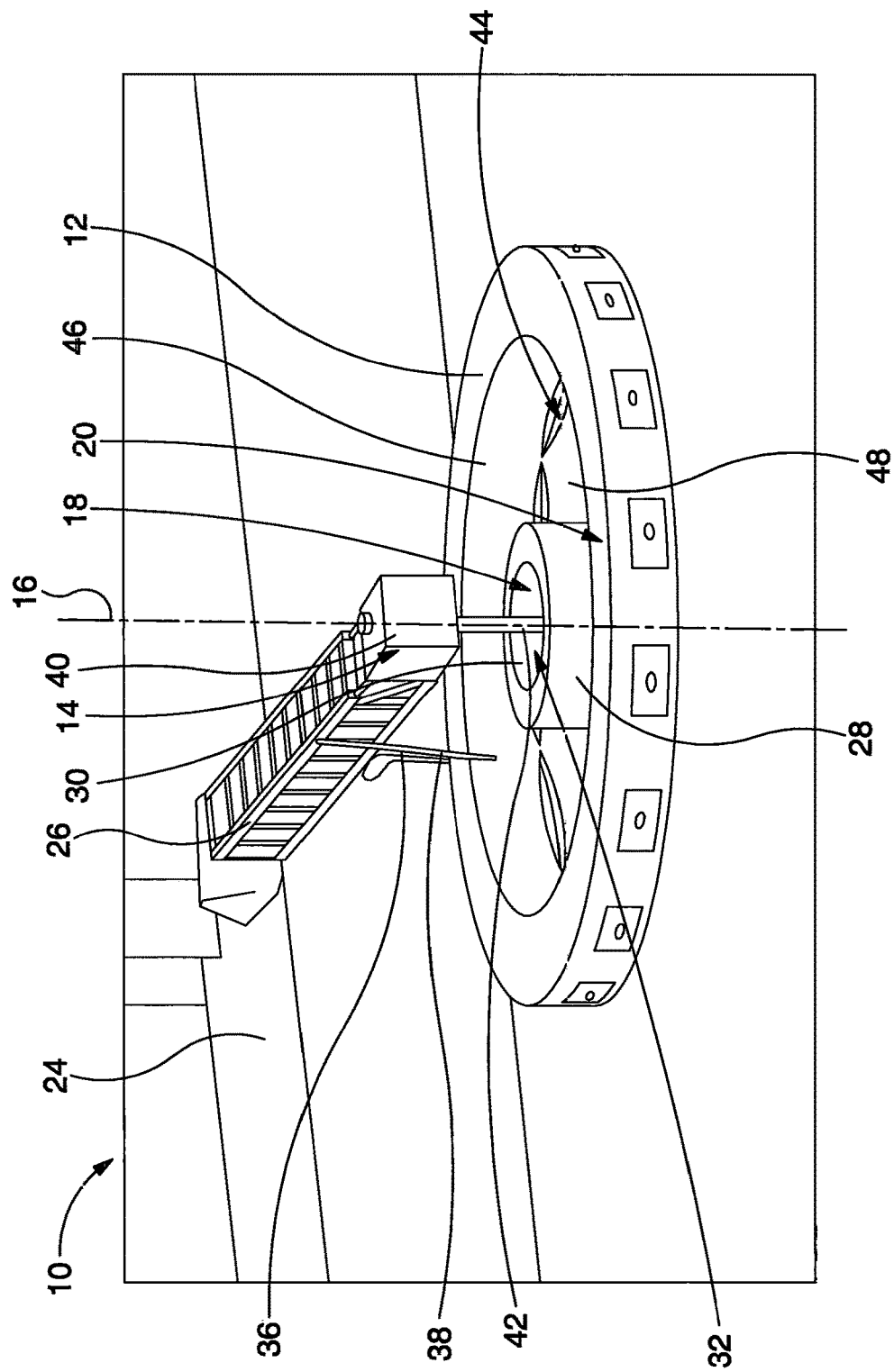
FIG. 3 is a perspective view of the buoyant conduit storage system of FIG. 1, with the interengaging coupling arrangement engaged.

When the reel 12 is maneuvered to a position with the second coupling portion 20 of the reel 12 approximately below the first coupling portion 18 of the drive arrangement 14, the first coupling portion 18 is lowered. As can be seen in FIGS. 2 and 3, the first coupling portion 18 is lowered by lowering an end portion of the boom 26. The boom 26 is hinged proximal to the coupling portion 18 and hinged distal to the coupling portion, proximal the dockside 24. The boom 26 defines a parallelogram movement such that the orientation of the first coupling portion 18 remains substantially constant, relative to the supporting dockside 24. The first coupling portion 18 remains substantially vertical throughout.

As can be seen in FIG. 3, the reel 12 comprises a central drum 28 with a funnel 30 guiding the first coupling portion 18 into engagement with the second coupling portion 20. Accordingly, the drive arrangement 14 can be coupled with the reel 12 with relatively imprecise positioning or with relative movement between the reel 12 and the drive arrangement 14.

As shown in FIG. 3, once coupled, the drive arrangement 14 moors the reel 12 relative to the dockside 24 via the interengaging coupling arrangement 32.

In use, the drive arrangement 14 transmits rotational drive forces to the reel 12 balanced around the axis of rotation 16. The drive arrangement 14 is configured to transmit balanced tangential forces to the reel 12. Accordingly, no applied tangential drive force requires a non-drive reaction component to resist a non-rotational or linear displacement of the reel 12 in a direction of an applied tangential drive force; and no additional mooring is required. The drive arrangement 14 is configured to rotate the reel 12 about the axis of rotation 16 with imparting substantially no propulsive horizontal non-rotational force component to the reel 12. Accordingly, the system 10 does not require compensation for any non-rotational force component from the drive arrangement 14. The reel 12 is subjected to less stresses or strains than may otherwise be possible. Accordingly, a lighter construction of the reel 12 may be possible.

The drive arrangement 14 provides for substantially axial drive transmission to the reel 12, substantially at the axis of rotation 16. The axis of rotation 16 is aligned with the centre of gravity of the reel 12. When in the neutral position, with the centre of buoyancy of the reel 12 vertically aligned with the centre of gravity of the reel 12, the drive arrangement 14 can accommodate a relative displacement of the centres of gravity and buoyancy (e.g. due to changing weight and/or water movement). Accordingly, the drive arrangement 14 allows a transmission of drive via the interengaging coupling arrangement 32 and un/reeling of conduit 34 in rougher water conditions than may otherwise be possible.

Figure 4:
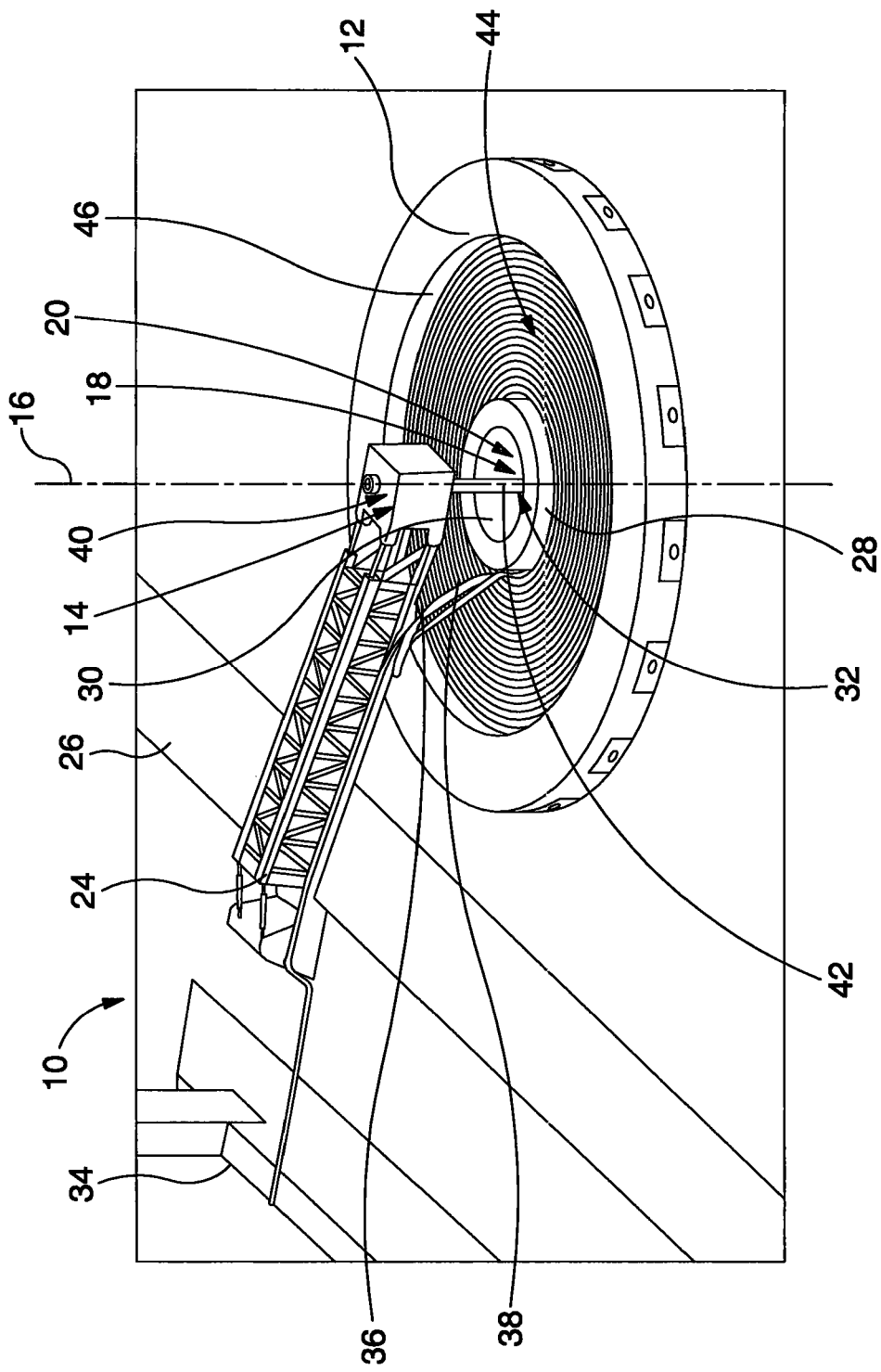
FIG. 4 is a perspective view of the buoyant conduit storage system of FIG. 1, with conduit reeled onto a reel.

With the reel 12 moored and the drive arrangement 14 engaged, reeling of conduit 34 onto the reel 12 can commence. As shown in FIG. 4, the conduit 34 is reeled onto the reel via a conduit guide 36. The conduit guide 36 comprises a gooseneck 38 which is pivotably movable relative to the boom 26. Accordingly a take-off position of the conduit 34 relative to the reel 12 is variable. In the embodiment shown, the conduit 34 is pulled through the conduit guide 36 by the rotation of the reel 12. However, it will be appreciated that in alternative embodiments the conduit 34 may be supplied to or actively driven through the conduit guide 36 by a conduit feed, such as a dockside conduit feed.

Mooring the reel 12 with the interengaging coupling arrangement 32 without any additional mooring, such as mooring lines, allows the reel 12 to move freely about the interengaging coupling arrangement 32, including rotationally under drive and with the movement of the body of water in which the reel 12 floats.

The drive arrangement 14 comprises a motor arrangement 40. The motor arrangement 40 is located directly above the interengaging coupling arrangement 32. Accordingly, the motor arrangement 40 is located at the axis of rotation 16. Drive is transmitted to the reel 12 from the motor arrangement 40 via a drive shaft 42, through the interengaging coupling arrangement 32.

The conduit guide 36 is attached to the boom 26. Accordingly, the conduit guide 36 can move upwards and downwards with the boom 26 as the reel 12 rises or falls with the movement of the water or with the change in weight due to the weight of reeled conduit 34 stored on the reel 12.

As can be seen in FIG. 4, the conduit 34 is reeled onto the reel 12 about the drum 28. The outside diameter of the drum 28 defines a radius larger than the minimum bending radius of the conduit 34. The first wrap of the conduit 34 is wound around the drum 28. Thereafter, the next wrap of the conduit 34 is spirally wound concentric with the first wrap. Accordingly, multiple layers of single wind wraps of conduit 34 are wound at a similar height about the drum 28. The reel 12 comprises a conduit storage volume 44 defined between the drum 28 and a sidewall 46, with a flange 48 extending therebetween. During winding (reeling or unreeling), the radial position of the conduit guide 36 is adjusted to support the conduit 34 at take-off (i.e. the gooseneck 38 is gradually radially extended). The multiple layers of single wind wraps of conduit 34 are wound substantially concentrically to define a first spiral of conduit 34 supported on the flange 48. As the spiral of conduit 34 approaches the sidewall 46, the conduit guide 36 is adjusted to retract the gooseneck 38 towards the drum 28 to initiate a second spiral wound towards the drum 28, on top of the first spiral. Accordingly, the conduit storage volume 44 may be filled with reeled conduit 34 by rotating the reel 12 with the drive arrangement 14. A controller (not shown) controls the relative position of the conduit guide 36.

It will be appreciated that in alternative embodiments, multiple helical winds of conduit 34 may be wound axially along the drum 28 at a first similar diameter to form a single layer; the next subsequent layer comprising multiple helical winds of conduit 34 wound axially along the drum 28 on top of the first single layer (i.e. at a second similar diameter, greater than the first similar diameter).

Figure 5:
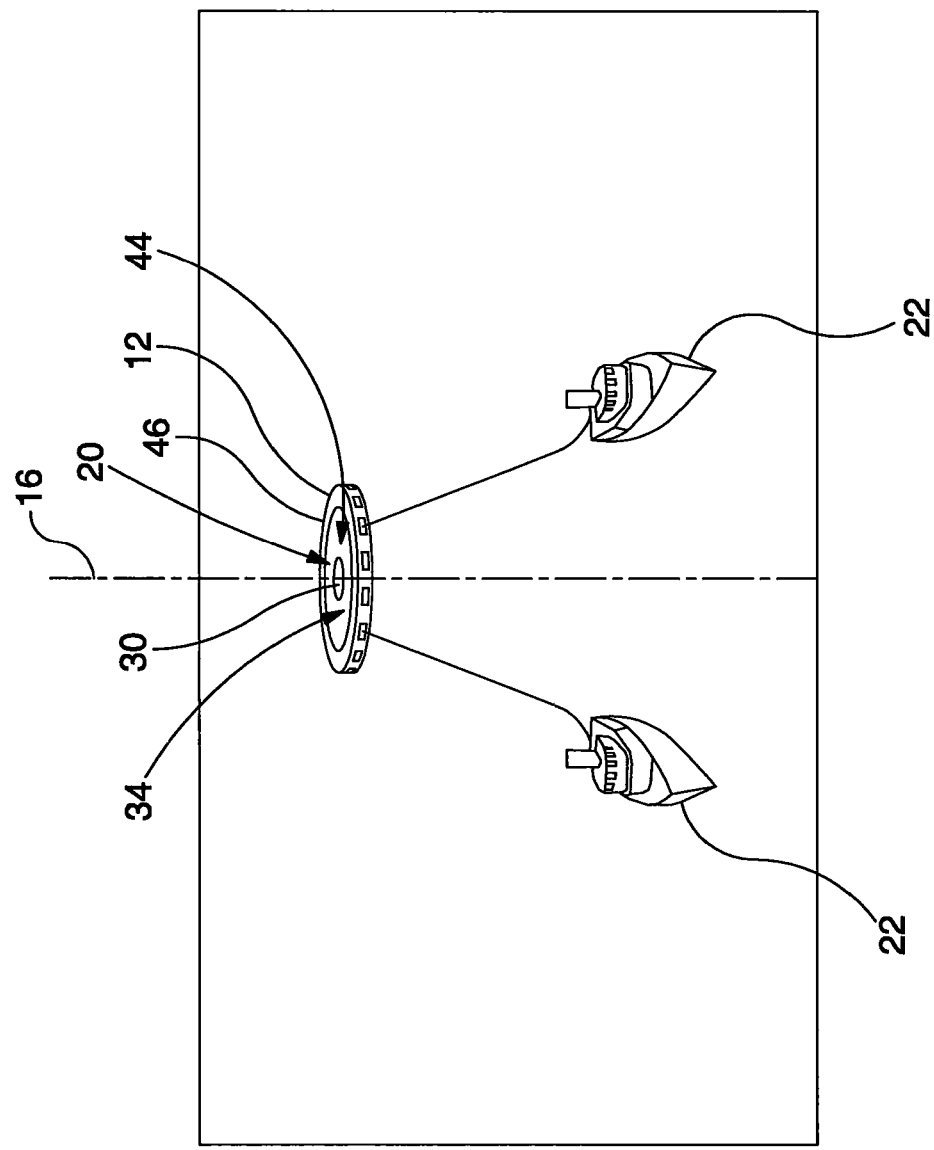
FIG. 5 is a perspective view of the reel of FIG. 4, being towed.

As shown in FIG. 5, once the reel 12 is suitably loaded with conduit 34, the conduit 34 may be transported with the reel 12. The reel 12 comprises an array of pad eyes 47 equally spaced around an outside circumference. The reel 12 can be towed to a marine deployment or other unloading site for unreeling. It will be appreciated that the unloading site may comprise a second drive arrangement 14 for coupling to the reel 12 to unreel the conduit 34 in a process substantially the reverse of that described between FIGS. 3 and 4.

Figure 6:
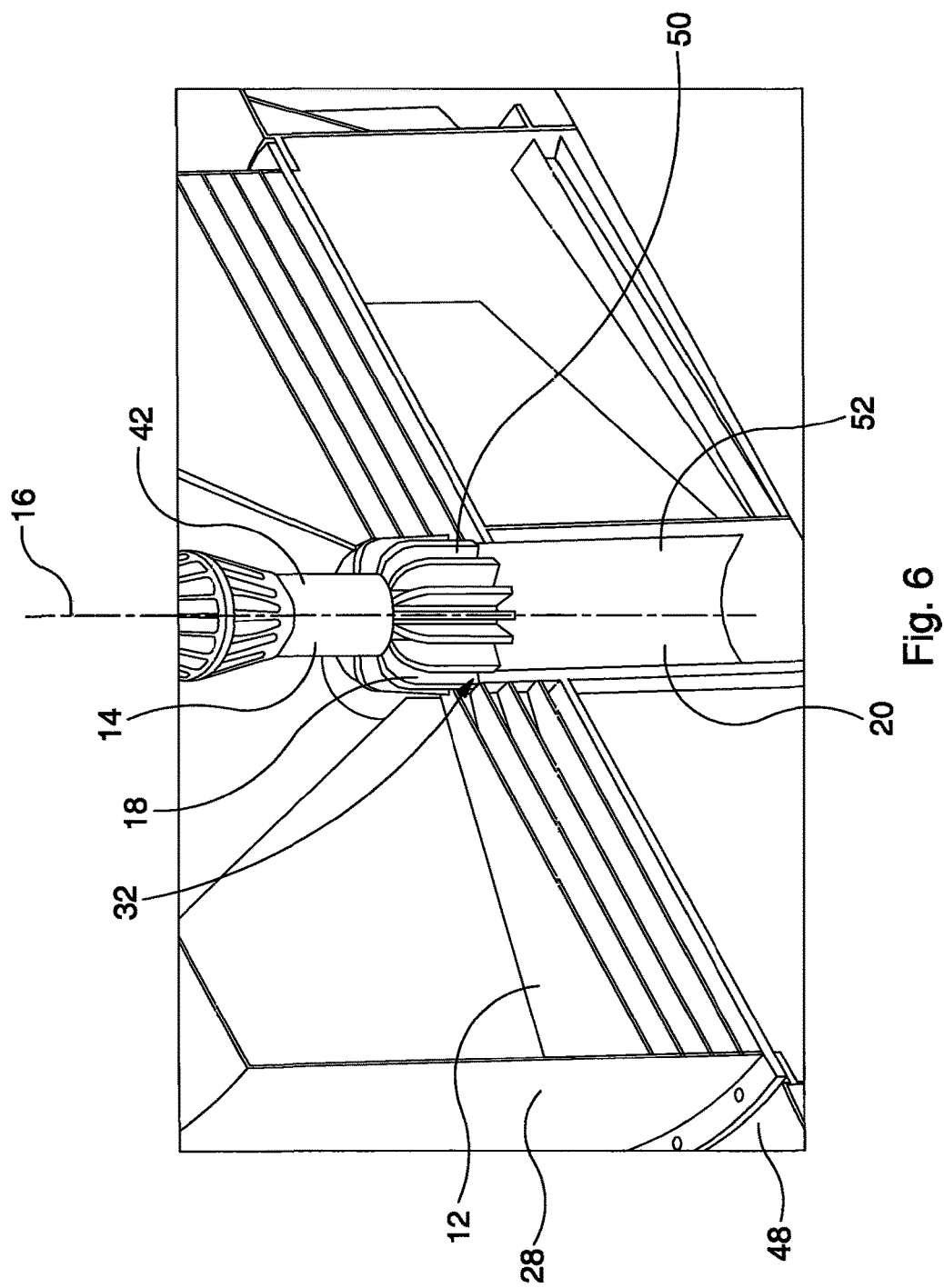
FIG. 6 is a perspective view of the interengaging coupling arrangement of the system of FIG. 1.

FIG. 6 shows the interengaging profiled coupling arrangement 32 as the first coupling portion 18 of the drive arrangement 14 enters the second coupling portion 20 of the reel 12. In the embodiment shown, the first coupling portion 18 comprises a male coupling portion with rounded spline ribs 50. The spline ribs 50 allow for a relative angular misalignment between the drive shaft 42 and the axis of rotation 16. Accordingly, power (in the form of drive) is still transmitted when the reel 12 pitches or rolls relative to the drive arrangement 14. In the embodiment shown, the second coupling portion 20 comprises a female coupling portion with axially extending ribs 52. The axially extending ribs 52 provide an axial path to accommodate a relative axial movement between the drive shaft 42 and the reel 12. Accordingly power is still transmitted when the reel 12 heaves relative to the drive arrangement 14, or when the weight of the reel 12 (e.g. due to the weight of reeled conduit 34) varies (and is not fully compensated by boom 26 pivoting).

The bolted attachment of the drum 28 to the flange 48 is also visible in FIG. 6. Accordingly, the drum 28 may be easily installed or removed, such as for repair, maintenance or interchangeability of drums (e.g. with differing external diameters and/or coupling portions 20).

Figure 7:
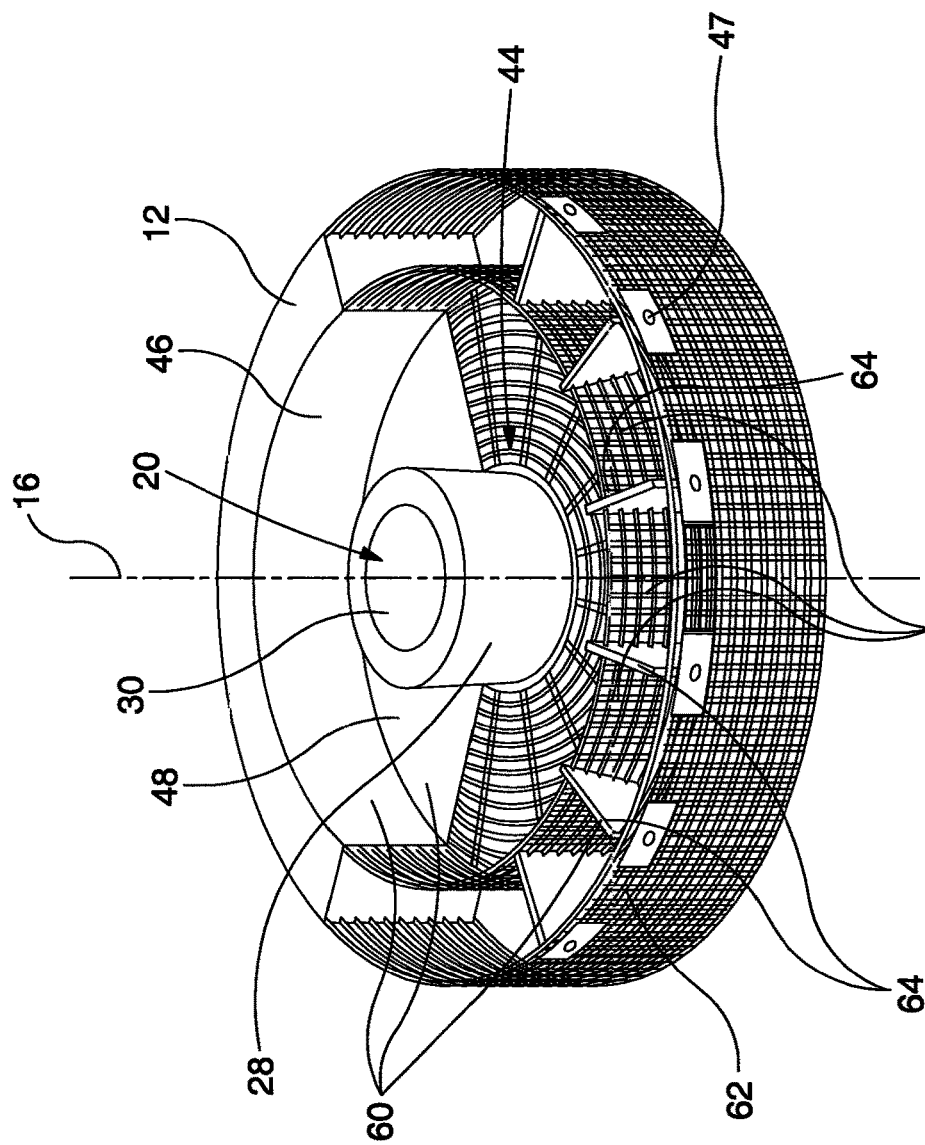
FIG. 7 is a partial cutaway view of the reel of FIG. 4.
Figure 8:
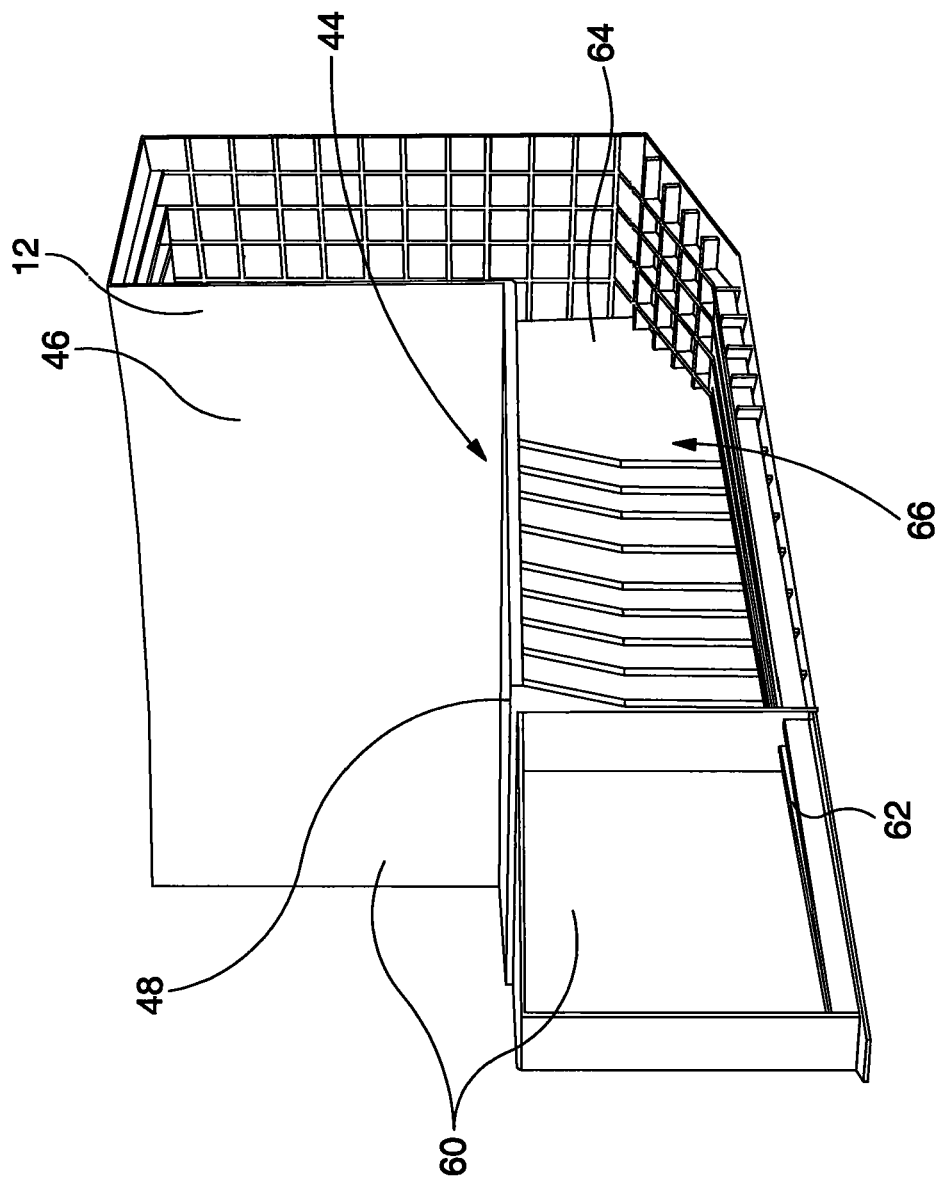
FIG. 8 is a further partial cutaway view of the reel of FIG. 4.
Figure 12:
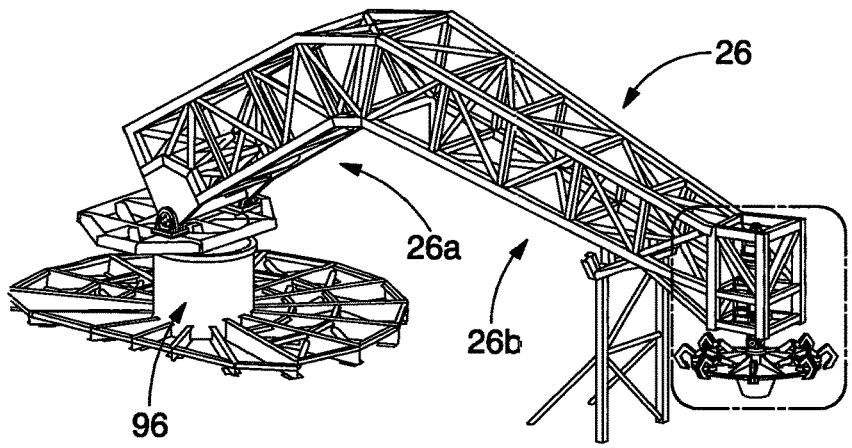
FIG. 12 is an isometric view illustrating part of a system in accordance with another embodiment of the invention.
Figure 13:
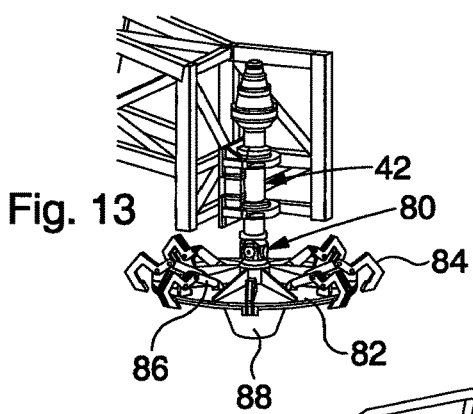
FIG. 13 illustrates part of the arrangement of FIG. 12 to an enlarged scale.
Figure 14:
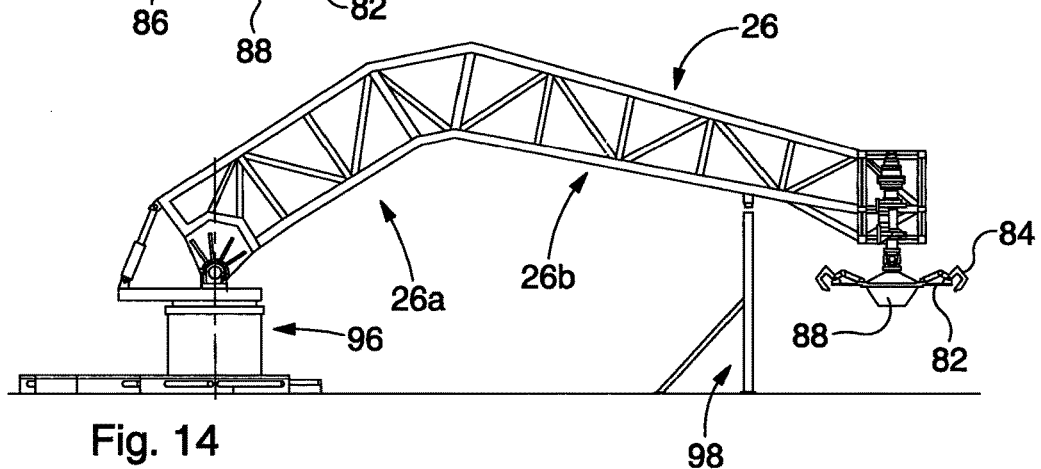
FIG. 14 is a side view illustrating part of the system of FIG. 12 in a stowed condition.
Figure 15:
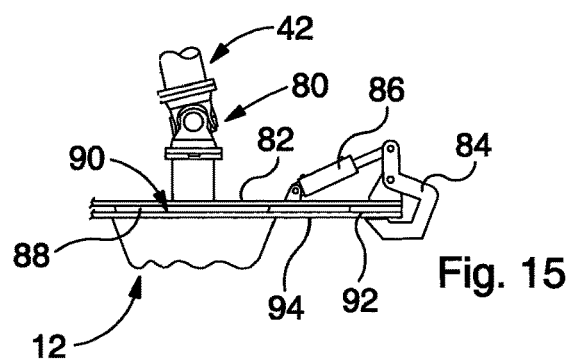
FIG. 15 is a diagram illustrating part of the system in use.

FIGS. 7 and 8 show partial cutaways of the reel 12. The hollow structure of the reel 12 is clearly visible. The reel 12 is constructed from plate materials 60 mounted to a chassis 62. Ribs 64 provide reinforcement. In addition, the ribs 64 compartmentalise the reel 12 such that a plurality of bulkheads 66 is defined. The reel 12 is configured such that the reel 12 will remain stable in water if at least one bulkhead 66 is breached. In the embodiment shown, the reel 12 is configured to remain stable if any combination of at least two bulkheads 66 are filled with water (of the sixteen segment bulkheads 66 defining the reel 12) in addition to the conduit storage volume 44 being filled with high density conduit 34 and flooded with water.

The reel 12 shown is configured to be towed. For example, as shown in FIG. 9, the reel comprises a bevelled or chamfered water contact portion 69. The reel 12 defines a hydrodynamic outer hull.

FIG. 10 shows a partial side view of the drive arrangement 14. The motor arrangement 40 shown comprises four motors 70, two of which 70 are visible in FIG. 9. A plurality of motors 70 ensures back up or reserve drive in the event of a motor 70 failure. In the embodiment shown, the motors 70 are hydraulic. The motor arrangement 40 is located directly above the first coupling portion 18. Accordingly, the motor arrangement 40 is located at the axis of rotation 16. Drive is transmitted to the reel 12 from the motor arrangement 40 via a chain 72 and sprocket 74 arrangement and the drive shaft 42, to the first coupling portion 18.

As can be seen in FIG. 11, the motors are circumferentially arranged about the axis of rotation 16. Each motor 70 comprises a drive sprocket 76 connected to a drive shaft bearing support 78. Each drive sprocket 76 cooperates with a discrete chain 72 and driven sprocket 74 to rotate (or brake) the drive shaft 42.

The drive arrangement 14 comprises modular components. For example, the drive arrangement 14 comprises a removable first coupling portion 18. Accordingly, the first coupling portion 18 may be removed to allow the use of alternative or replacement coupling portions 18. An alternative coupling portion may be provided to suit an alternative reel or an alternative drum (not shown). The drive arrangement 14 is adaptable to suit various reeling/unreeling environments. For example, an alternative length of drive shaft 42 may be provided to suit an alternative support 24, such as a ship 22 with an alternative mounting location for the boom 26 and/or length of boom 26.

FIGS. 12 to 15 illustrate an alternative embodiment of the invention. To a large extent, the embodiment of FIGS. 12 to 15 is the same as or very similar to the arrangement described hereinbefore, and so only the significant differences therebetween will be described in detail below.

A first distinction between the arrangement of FIGS. 12 to 15 and that described herein resides in the shape of the boom 26. In the arrangement of FIGS. 1 to 11, the boom 26 is of generally straight form, hingedly mounted to a dockside or the like. It is thought that where the height of the dockside above sea level is relatively small, then there is a risk that the periphery of the reel 12, when the reel 12 is attached to the boom 26, may foul against part of the boom 26. In order to reduce the risk of such fouling, in the arrangement of FIGS. 12 to 15, the boom 26 is not of generally straight form but rather is in the form of a pair of straight parts 26a, 26b which are interconnected with one another with the result that the boom 26 is of canted or bent form. As a result there is an increased clearance between the boom 26 and the periphery of a reel 12 secured thereto, in use. The risk of fouling is thus reduced.

A second significant distinction between the arrangement of FIGS. 1 to 11 and that of FIGS. 12 to 15 resides in the nature of the connection or coupling between the boom 26 and a reel 12. In the arrangement of FIGS. 1 to 11, the drive shaft 42 carries, at its lower end, a male coupling portion with rounded spline ribs 50 received, in use, within a correspondingly splined passage or recess formed in the lower part of the reel 12. The shaping of the spline ribs 50 is chosen so as to allow a degree of articulation between the reel 12 and the drive shaft 42, for example to accommodate tilting of the reel 12 as may result from the reel 12 floating upon or within water which may be moving. It is thought that the operation of correctly positioning the male coupling portion may be difficult as an operator will not be able to see the male coupling portion as it approaches the splined passage or recess, the male coupling portion being obscured by other parts of the reel 12 during this operation. Furthermore, the coupling does not positively secure the reel 12 to the drive shaft 42, and so there is a risk of detachment, in use. Further, as the drive shaft 42 is of multipart form, the joints between the various parts thereof must be capable of bearing significant loads resulting from, for example, tilting of the reel 12, in use.

In the arrangement of FIGS. 12 to 15, the drive shaft 42 incorporates a universal joint 80 part way along its length. Beneath the universal joint 80, the drive shaft 42 carries an outwardly projecting plate 82 upon which are pivotally mounted a series of clamp arms 84. Each clamp arm 84 is of hooked form and is pivotable between a raised, released position (see FIG. 14) and a lowered position (see FIG. 15). Each clamp arm 84 has a hydraulic ram 86 associated therewith an operable to drive the respective clamp arm 84 between these positions.

Beneath the plate 82 is provided a projecting frustoconically shaped hub 88 which is adapted to be received within a correspondingly shaped recess 90 provided in the upper face of the reel 12. The underside of the plate 82 is provided with a suitable friction material 92, such that when the hub 88 is received within the recess 90, the friction material 92 bears against the upper surface of an outwardly extending flange 94 which surrounds the recess 90. Once so positioned, movement of the clamp arms 84 under the control of the rams 86 to their lowered positions positively clamps the plate 82 and flange 94 together. Rotation of the drive shaft 42 under the control of the motor arrangement 40 drives the plate 82 for rotation. As the plate 82 is positively clamped to the flange 92, the rotation of the plate 82 drives the flange 94, and hence the remainder of the reel 12 to which the flange 94 is connected, for rotation, the friction material 92 assisting in the transfer of the rotary motion to the flange 94.

It will be appreciated that tilting motion of the reel 12 can be accommodated by the universal joint 80, thereby avoiding the application of excessive side loads or bending loads to other parts of the drive shaft 42. As, during the operation of securing the reel 12 to the boom 26, the operator simply needs to introduce the hub 88 into the recess 90 which is formed in the upper part of the reel 12 and so is visible to an operator, the operation of securing the reel 12 to the boom 26 can be undertaken reasonably simply, quickly and efficiently. Once correctly positioned, movement of the clamp arms 84 to their lowered positions firmly clamps the plate 82 and flange 94 to one another, securely attaching the reel 12 to the boom 26. Undesired detachment of the reel 12 from the boom 26 is thus avoided.

The boom 26 is conveniently mounted upon the dockside upon a turntable 96 such that when not in use, the boom 26 can be positioned over the dockside and the boom 26 moved to a lowered position so that an end part of the boom 26 is supported by a rest or support 98 mounted upon the dockside.

It should be understood that the embodiments described herein are merely exemplary and that various modifications may be made thereto without departing from the scope of the invention.

For example, in alternative embodiments it will be appreciated that the drum may be rotatable with respect to the sidewall (and/or the flange). Accordingly, conduit may be reeled and/or unreeled without rotating the entire reel in the body of water. Similarly, although the conduit shown in the embodiments is a high density cable, it will be appreciated that in alternative embodiments the conduit may comprise tubing, such as tubulars or coiled tubing for use in the oil and gas industry, or pipeline for use other fluid-transport applications.

Likewise, although shown here with a drive shaft, it will be appreciated that in other embodiments an alternative transmission may be provided. For example, the system may comprise a magnetic and/or a flexible coupling.

The invention claimed is:

1. A buoyant conduit storage system comprising:
 a reel for storing conduit, the reel being rotatable about a substantially vertical axis of rotation to reel and/or unreel the conduit;
 a drive arrangement for rotating the reel at the axis of rotation; and
 an interengaging coupling arrangement for releasably connecting the drive arrangement to the reel;
 wherein the drive arrangement comprises a drive shaft that is substantially coaxial with the reel providing a substantially vertical axial drive transmission to the reel, applying balanced drive forces to the reel, and is thus configured to rotationally drive the reel substantially without imparting a lateral propulsive force thereto.

2. The buoyant conduit storage system of claim 1, wherein the reel is centrally driven by the drive arrangement.

3. The buoyant conduit storage system of claim 1, wherein the reel is driven substantially about the centre of gravity of the reel or the centre of buoyancy of the reel.

4. The buoyant conduit storage system of claim 1, wherein the conduit comprises at least one of a cable, a wire, a tubing and a pipe.

5. The buoyant conduit storage system of claim 1, wherein the drive arrangement comprises a motor arrangement positioned substantially at the axis of rotation of the reel.

6. The buoyant conduit storage system of claim 1, wherein the interengaging coupling comprises a plate mounted upon a drive shaft, mounting means provided on the reel for cooperation with the plate, and clamp means operable to clamp the plate and the mounting means to one another.

7. The buoyant conduit storage system of claim 6, wherein the clamp means comprises at least one movable clamp arm provided upon the plate.

8. The buoyant conduit storage system of claim 6, wherein the drive shaft incorporates a universal joint.

9. The buoyant conduit storage system of claim 1, wherein the system is configured to allow transmission of drive to the reel when and/or whilst the reel is vertically and/or angularly displaced.

10. The buoyant conduit storage system of claim 1, wherein the drive arrangement is dynamically supported.

11. The buoyant conduit storage system of claim 1, wherein the drive arrangement is configured to position and/or moor the reel.

12. The buoyant conduit storage system of claim 1, wherein the system is configured to adjust the drive arrangement according to a movement of the reel.

13. The buoyant conduit storage system of claim 1, wherein the system comprises a conduit guide defining at least a portion of a path for conduit between a source of conduit to be reeled and the reel, wherein the conduit guide comprises a channel.

14. The buoyant conduit storage system of claim 1, wherein the system comprises a powered conduit feed configured to supply conduit to be reeled onto the reel.

15. The buoyant conduit storage system of claim 1, wherein the system comprises a conduit tensioner.

16. The buoyant conduit storage system of claim 1, wherein at least part of the interengaging coupling arrangement is carried by a boom, and wherein the boom is of bent or canted form.

* * * * *